United States Patent
Komuro et al.

[11] Patent Number: 5,943,156
[45] Date of Patent: Aug. 24, 1999

[54] POLARIZING PLATE AND METHOD OF MANUFACTURING POLARIZING PLATE

[75] Inventors: Eiju Komuro; Tohru Kineri; Kouji Tanabe, all of Chiba, Japan

[73] Assignee: TDK Corporation, Tokyo, Japan

[21] Appl. No.: 09/028,116

[22] Filed: Feb. 23, 1998

[30]  Foreign Application Priority Data

Apr. 25, 1997 [JP] Japan ................................. 9-123195
Jun. 13, 1997 [JP] Japan ................................. 9-173249
Jun. 18, 1997 [JP] Japan ................................. 9-177658

[51] Int. Cl.$^6$ .............................. G02B 5/30; G02B 1/08; G02B 1/10

[52] U.S. Cl. ..................... 359/280; 359/483; 359/492; 427/547; 427/550

[58] Field of Search ........................... 359/280, 483, 359/492; 427/212, 372.2, 376.2, 547, 550

[56]  References Cited

U.S. PATENT DOCUMENTS 4,304,584 12/1981 Borrelli et al. ...................... 65/30.11
4,908,054  3/1990 Jones et al. ........................ 65/30.11

FOREIGN PATENT DOCUMENTS 56-169140 12/1981 Japan .
60-212706 10/1985 Japan .
 8-27409  3/1996 Japan .
 2578377 11/1996 Japan .
10-048419  2/1998 Japan .

OTHER PUBLICATIONS

M. Taylor, et al. , "High contrast polarizers for the near infrared.", Proc. SPIE Int. Soc. Opt. Eng., vol. 1166, 1990, pp. 446–453.

*Primary Examiner*—Georgia Epps
*Assistant Examiner*—Margaret Burke
*Attorney, Agent, or Firm*—Oblon, Spivak, McClelland, Maier & Neustadt, P.C.

[57]  ABSTRACT

A polarizing plate includes a polarizing layer for controlling a light and producing a polarized light, the polarizing layer having a particle dispersing medium with a property of light transmission and bar-like polarizing particles which are dispersed in the particle dispersing medium and arranged in a constant direction with a magnetic field, where each of the bar-like polarizing particles is provided with a bar-like ferromagnetic particle of chromium dioxide, whose surface is coated with a conductive film.

12 Claims, 3 Drawing Sheets

POLARIZING PLATE AND METHOD OF MANUFACTURING POLARIZING PLATE

BACKGROUND OF THE INVENTION

1. Field of the Invention

The present invention relates to a polarizing plate for use in a liquid crystal display, an optical communication, optical sensors, polarizing sunglasses or the like and to its manufacturing process.

2. Description of the Prior Arts

As a linear polarizing plate heretofore used in a liquid crystal display or the like, a linear polarizing film using iodine or dye is well known. In the film, by stretching a base film, dichroic materials of iodine or dye are oriented to obtain a polarizing property. Therefore, at present, the base film is restricted to a material suitable for the stretching process, i.e., polyvinyl alcohol or the like.

Also, in a stretching process of the base film, it is necessary to control and adjust a temperature in the stretching process, a film quality, a stretching force, etc., strictly.

To solve the problem, a publication of patent application examined and published No. Hei 8-27409 proposes a polarizing plate in which fine magnetic particles are arranged in a constant direction by a magnetic field in a polarizing layer and interconnected to form multiple bar-shaped elements. In the proposed polarizing layer, a direction of a major axis of the bar-shaped elements shows an absorption axis of light and a direction perpendicular to the major axis direction shows a transmission axis. Thus, in the patent, it is reported that a light through the polarizing layer is polarized and the direction of the transmitted light is in the same direction perpendicular to the major axis direction of the bar-shaped elements.

However, the bar-shaped elements disclosed in the publication No. Hei 8-27409 are formed in bar configurations by interconnecting plural substantially spherical particles by means of magnetic field. It is remarkably difficult to control the number of the magnetic particles constituting the bar configurations. Therefore, the configurations of the bar-shaped elements cannot become uniform (an aspect ratio of a length of the major axis to a length of the minor axis is not constant), and an extinction ratio should be low. It is also difficult to adjust the aspect ratio of the bar-shaped elements in accordance with a wavelength of a light for use. Also, in the interconnected bar-shaped elements, the magnetic particles can optionally change directions at each interface of the particles. Therefore, it is difficult to align all the bar-shaped elements orderly in the same direction to the direction of magnetic field. Further, assuming that the polarizing effect of the bar-shaped elements described in the publication No. Hei 8-27409 is due to a principle that a light which has a certain direction of an electric field was absorbed because electrons in the magnetic particles vibrates in the same direction of the electric field, then in case of No. Hei 8-27409, the extinction ratio is rather small because electrons cannot move beyond the boundary of the magnetic particles. A light which has an electric field in the same direction of the major axis of the magnetic particles, is not absorbed enough because electrons cannot move smoothly at the boundaries. From the above, it is difficult to prepare a polarizing plate with a high extinction ratio in the method disclosed in the publication No. Hei 8-27409.

On the other hand, a publication of patent application laid-open No. Sho 60-212706 proposes a method of manufacturing a polarizing plate by aligning dichroic materials using a magnetic field or an electric field. Particularly, as the dichroic material, a liquefied tin chloride is used in an embodiment. Further, it is described that metallic salts, metallic crystals, non metallic crystals or the like are other preferable materials. However, the polarizing plate has been increasingly requested to have a high level of the extinction ratio or other properties. It cannot be said that the prior arts in the patent of No. Sho 60-212706 reach a satisfactory level. Further, the use of bar-shaped particles is not described, and it can be said to be difficult to obtain a high extinction ratio. Additionally, the dichroic materials (tin molecules or crystals) described as the embodiment in the publication No. Sho 60-212706 are just existed to be aligned using a magnetic field on a transparent glass plate, but are not fixed in a laminated cured medium. Therefore, it can be supposed that in the process of forming a protective layer, the substances may collapse because of some physical external forces, e.g., a pressure applied on the crystals or the molecules. Further, the aforementioned proposals have a problem that the polarizing property cannot be easily optimized in accordance with the wavelength of the light for use.

A polarizing plate used in optical communication is disclosed in a publication of patent application laid-open No. Sho 56-169140. This is a polarizing glass which is constituted by dispersing bar-shaped silver halide and silver particles into glass. Among the components dispersed in the glass of prior art, the silver particles are considered to mainly exhibit a dichroism and contribute to the polarizing effect.

Also, in a technical document, Proc. SPIE Int. Soc. Opt. Eng., Vol. 1166, pp. 446–453, it is disclosed that by increasing a length of a major axis of bar-shaped silver particles, a wavelength at which a high extinction ratio can be obtained is shifted to longer wavelength. Thus, it is suggested that the wavelength at which the high extinction ratio can be obtained can be controlled by a particle aspect ratio.

The aspect ratio of the bar-shaped silver particles which are disclosed in the publication No. Sho 56-169140 is determined by pressures and heat treatment conditions in elongating process of glass and reduction process. However, it is very difficult to control the conditions. The distribution of the aspect ratio cannot be adjusted optionally. Usually, the distribution of the aspect ratio tends to be a normal distribution.

As a related art of the publication No. 56-169140, a publication of J.P. Patent No. 2578377 discloses a polarizing glass which similarly uses silver halide or silver particles and exhibits a high extinction ratio in a relatively broad wavelength region. According to the publication, by performing a burning process under pressure and a reducing environment instead of performing under atmospheric pressure, an effective bandwidth in which the polarizer shows a high extinction ration can be broadened. Although the polarizing glass exhibits the high extinction ratio in the relatively board band as aforementioned, its manufacturing process disadvantageously requires a large number of steps. Further, in analogy with the polarizing glass disclosed in the publication No. Sho 56-169140, it is very difficult to control pressures and thermal treatment conditions for elongating the glass and reduction process. It is, therefore, difficult to prepare a large quantity of uniform polarizing glasses inexpensively.

Also, as aforementioned, the publication No. Hei 8-27409 proposes the polarizing plate in which the magnetic particles are arranged in the constant direction by the magnetic field in the polarizing layer and interconnected to form the multiple bar-shaped elements. The bar-shaped elements are formed in bar configurations by interconnecting multiple substantially spherical elements through a magnetic field orientation. Therefore, it can be said that it is remarkably difficult to control the number of the magnetic particles constituting the bar configurations. Since the bar-shaped elements cannot be uniformly formed, it is remarkably difficult to control the aspect ratios and the distribution thereof. Also in the bar-shaped elements, since the magnetic particles can freely change directions at each interface of the particles, it is difficult to align all the bar-shaped elements orderly in the same direction to the direction of the magnetic field. Therefore, it is difficult to produce a polarizing plate showing high extinction ratio in the broad wavelength region, uniformly.

The publication No. 2578377 proposes the method of manufacturing the polarizing glass by dispersing and depositing the Ag particles in a glass matrix. According to the prior art, the manufacturing process of the polarizing glass requires a large number of steps, such as melting of glass, thermal treatment, stretching, grinding/polishing, reduction and burning processes. Further, each process requires a remarkably complicated operation. Detailed descriptions about preparing process of the polarizing plate are as follows. First, a glass containing silver halide particles are stretched to make the silver halide particles ellipsoid and to align the particles in the stretched direction. Then, after the polishing process, the glass containing silver halide particles are reduced and burned in a hydrogen atmosphere to deposit the Ag particles in the glass and, finally, the polarizing glass is obtained.

However, in the manufacturing process of the polarizing glass disclosed in the publication of patent No. 2578377, the aspect ratio of the deposited Ag particles cannot be adjusted easily. Also, the manufacturing process includes multiple steps and is not suitable for mass production. Further, the manufacturing method is not appropriate for a large-sized polarizing glass. Therefore, it is difficult to supply a large quantity of large-sized polarizing plates inexpensively.

SUMMARY OF THE INVENTION

Wherefore, an object of the invention is to provide a polarizing plate which can be manufactured inexpensively in large quantities, further which has a high extinction ratio and remarkably high performance and reliability and still further in which a polarizing property can be easily optimized in accordance with a wavelength of a light for use.

Another object of the invention is to provide a polarizing plate in which a uniformly high extinction ratio and transmittance can be obtained in a broad wavelength region, and further in which a polarizing property can be easily optimized in accordance with a wavelength of a light for use.

Further object is to provide a polarizing plate which has remarkably high performance and reliability. Still further object is to provide a method of manufacturing a polarizing plate which has a good productivity, and large-sized products are realized in the method.

To attain these and other objects, a first aspect of the invention provides a polarizing plate which is provided with a polarizing layer for controlling a light and producing a polarized light. The polarizing layer has a particle dispersing medium with a property of light transmission, and has bar-like polarizing particles which are dispersed in the particle dispersing medium and arranged in a constant direction with a magnetic field. The bar-like polarizing particle has a bar-like ferromagnetic particle constituted of chromium dioxide whose surface is coated with a conductive film. There can be obtained the polarizing plate which can be manufactured inexpensively in large quantities, and which has a high extinction ratio and remarkably high performance and reliability and further in which the polarizing property can be easily optimized in accordance with a wavelength of a used light.

A second aspect of the invention provides a polarizing plate, which is provided with a polarizing layer for controlling a light and producing a polarized light. The polarizing layer has a particle dispersing medium with a property of light transmission and bar-like polarizing particles which are dispersed in the particle dispersing medium and arranged in a constant direction with a magnetic field. The bar-like polarizing particles are constituted by mixing two or more types of bar-like polarizing particles which are different in average aspect ratio. Each of the two or more different types of bar-like polarizing particles has a bar-like ferromagnetic particle constituted of chromium dioxide whose surface is coated with a conductive film. There can be obtained the polarizing plate which can be manufactured inexpensively in large quantities, and which has a uniformly extinction ratio and transmittance in a broad wavelength region and further in which the polarizing property can be easily optimized in accordance with the wavelength of a used light.

A third aspect of the invention provides a polarizing plate, which is provided with a polarizing layer for controlling a light and producing a polarized light on a substrate which is transparent for light. The polarizing layer has a glass matrix which is obtained in a sol-gel process by application of a material including a sol glass matrix to the substrate followed by gelation of an applied film. The layer also has bar-like polarizing particles, which are dispersed in the glass matrix and arranged in a constant direction with a magnetic field. The bar-like polarizing particle has a bar-like ferromagnetic particle constituted of chromium dioxide whose surface is coated with a conductive film. There can be obtained the polarizing plate with relatively high performance and reliability.

A fourth aspect of the invention provides a method of manufacturing a polarizing plate which is provided with a polarizing layer for controlling a light and producing a polarized light on a substrate which is transparent for light. The method has a process of preparing a sol solution with a composition in accordance with a glass matrix constituting the polarizing layer; a solution preparation process of preparing a sol solution by letting the sol solution contain bar-like polarizing particles each having a bar-like ferromagnetic particle constituted of chromium dioxide whose surface is covered with a conductive film; a process of applying the application sol solution on the substrate to form a polarizing layer film; a magnetic orientation process of aligning the bar-like polarizing particles in the polarizing layer film in a magnetic field; and a curing process of an applied film, including gelation of the glass matrix in the polarizing layer. There can be provided the method of manufacturing the polarizing plate which has a good productivity and large-sized products are realized easily in the method.

DETAILED DESCRIPTION OF THE PREFERRED EMBODIMENTS

A first embodiment of a polarizing plate according to the present invention is now described with reference to the accompanying drawings.

Figure 1:
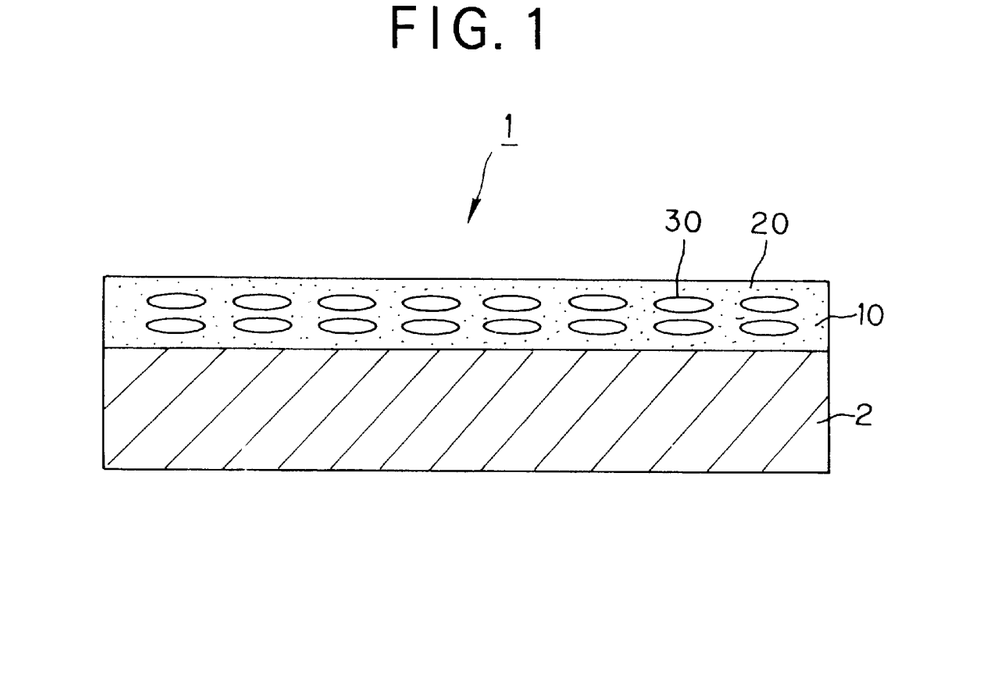
FIG. 1 is a sectional view showing a polarizing plate embodying the present invention.

FIG. 1 is a sectional view of a polarizing plate 1 embodying the present invention.

As shown in FIG. 1, the polarizing plate 1 of the invention is formed by applying a polarizing layer 10 on a substrate 2.

The polarizing layer 10 has a particle dispersing medium 20 with a property of light transmission and with multiple bar-like polarizing particles 30 which are dispersed in the particle dispersing medium 20 and arranged in a constant direction with a magnetic field.

Figure 2:
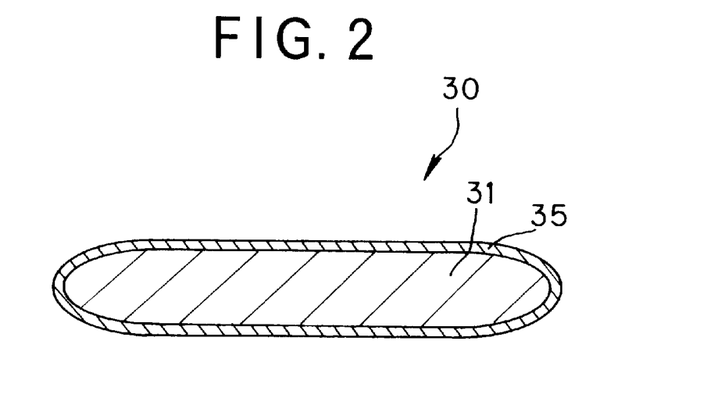
FIG. 2 is a sectional view showing a structure of a bar-like polarizing particle to facilitate the understanding thereof.

The bar-like polarizing particle 30 is, as shown in a conceptual view of FIG. 2, constituted of a bar-like ferromagnetic particle 31 of chromium dioxide ($CrO_2$) and a conductive film 35 with which a surface of the particle 31 is coated.

The bar-like ferromagnetic particle 31 of chromium dioxide has a single integral configuration. A needle or other bar-like configurations can be easily obtained for chromium dioxide. Also, the bar-like ferromagnetic particle 31 constituted of chromium dioxide has a good uniformity and surface quality of the needle-like configuration (e.g., there are few irregularities on the surface and the tip end of the needle configuration is not branched). Further, an aspect ratio can be optionally changed in a relatively broad range. Also, the chromium dioxide has a good dispersibility in the particle dispersing medium 20 and also has a good productivity and quality.

In the invention the aspect ratio of the bar-like ferromagnetic particle 31 constituted of chromium dioxide is not especially restricted, and is usually set appropriately within an aspect ratio range from 1.5 to 30 in order to get an optimum polarizing property in accordance with a wavelength of a used light. Therefore, high extinction ratios can be obtained for various wavelengths. Additionally, a length of major axis of the bar-like ferromagnetic particle 31 is usually in the range from about 0.01 to 1 $\mu$m.

Figure 3A:
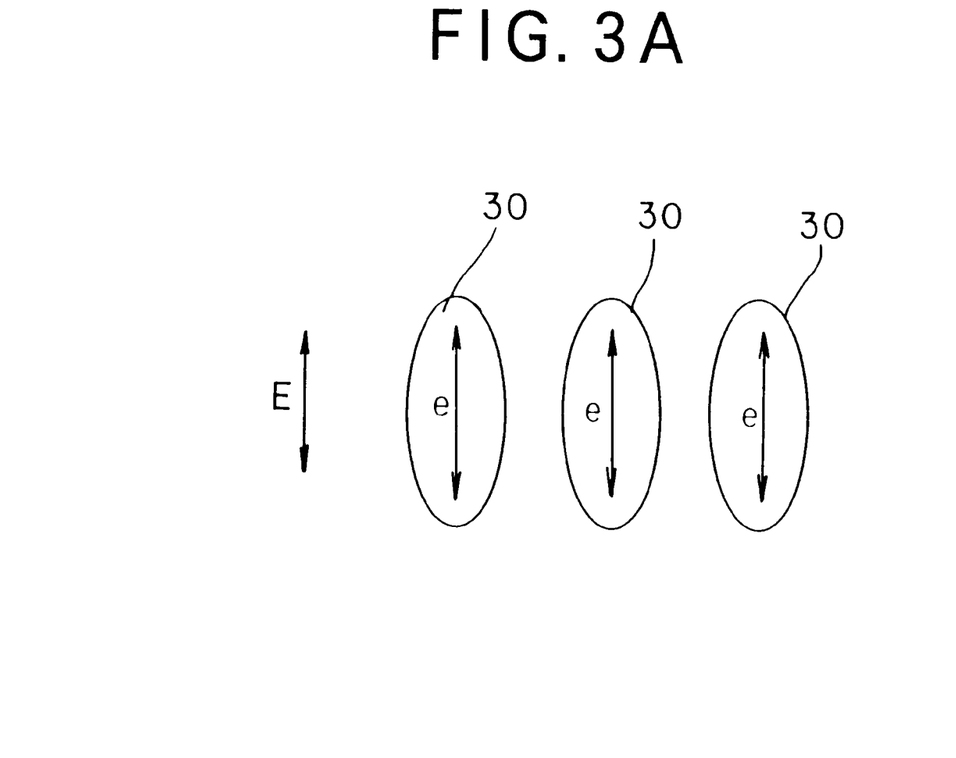
FIGS. 3A and 3B are diagrammatic representations each showing a relationship between a direction of a major axis of bar-like polarizing particles and a vibrating direction of a light (direction of electric field E).
Figure 3B:
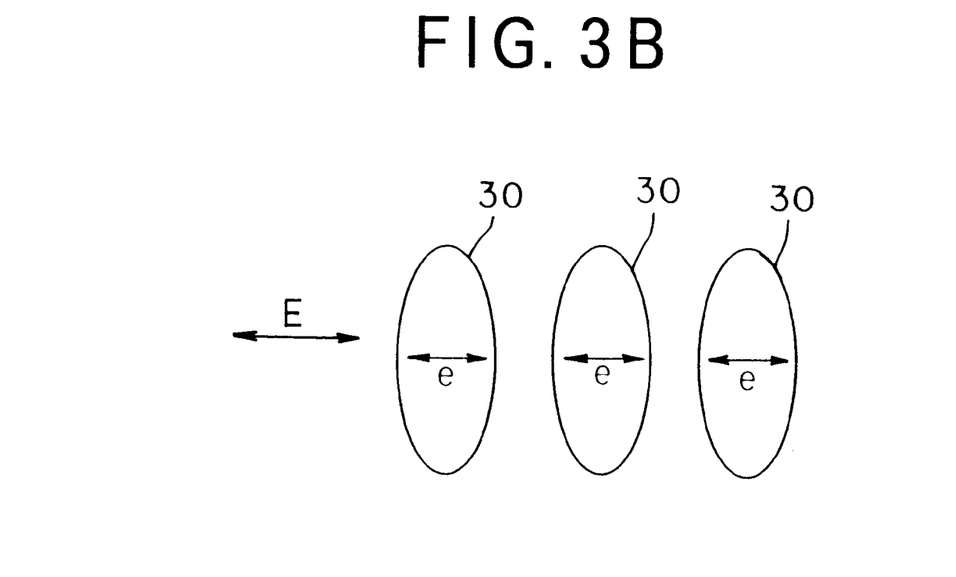

The surface of the ferromagnetic particle 31 is, as aforementioned, coated with the conductive film 35 to form the bar-like polarizing particle 30. For the conductive film 35, gold, silver, copper, nickel, tin or other well conductive metal materials are used. In the invention, by forming the conductive film 35, a free electron is permitted to exist on the surface of the bar-like polarizing particle 30. A light which has a certain direction of an electric field is absorbed because electrons in the bar-like polarizing particle 30 vibrates in the same direction of the electric field, and a polarized light is obtained. This principle is further detailed by using FIGS. 3A and 3B. FIGS. 3A and 3B show relationships between a direction of a major axis of the bar-like polarizing particles 30 and a vibrating direction of a light (direction of electric field E). FIG. 3A shows a case that the electric field E of the light is parallel to a major axis of the particles, while FIG. 3B shows a case that the electric field E of the light is perpendicular to a major axis. As shown in FIG. 3A, a light component which has the electric field E vibrating in parallel to the major axis of the bar-like polarizing particles 30 is absorbed by the bar-like polarizing particles 30 because of the vibration of the electrons. On the other hand, as shown in FIG. 3B, when a light component has the electric field E vibrating perpendicular to the major axis of the bar-like polarizing particles 30, the electrons hardly vibrate. Therefore, the light component is scarcely absorbed because there is not an enough distance in the particle to move for electrons. Consequently, only the light component, which vibrates perpendicular to the major axis of the bar-like polarizing particle 30 is transmitted and comes to be a polarized light.

The conductive film 35 is formed by, for example, electroless plating, vacuum evaporation, vacuum sputtering or other methods. Also, in the arranging process of the bar-like polarizing particles 30 in the constant direction with a magnetic field, a permanent magnet, an electromagnet, a solenoid or other generating means of magnetic field can be used while the particle dispersing medium is not dried. The orientation is usually performed along a conveying direction of the substrate, but specified otherwise in some cases and not especially restricted.

As the particle dispersing medium 20 with the property of light transmission, for example, various transparent media in which resin particles are dispersed can be used. Since the polarizing layer 10 is formed by coating method, the media in which resin particles are dispersed preferably contain a thermosetting resin, a reactive setting resin, an ultraviolet or electron-beam setting resin or the like which can be cured finally.

A content ratio of the bar-like polarizing particles 30 to the particle dispersing medium 20 may be appropriately selected in a range in which the polarizing effect of the polarizing layer 10 appears. If the content ratio of the bar-like polarizing particles 30 is excessively small, a sufficient polarizing property cannot be obtained. If the content ratio of the bar-like polarizing particles 30 is excessively large, in some cases the bar-like polarizing particles 30 interfere with one another and the polarizing property is changed.

As the substrate 2 on which the polarizing layer 10 is formed, glass, plastic or the like which has a property of light transmission can be used. The configuration of the substrate 2 can be selected variously in accordance with purpose and use.

Also, in the present invention, the existence of the substrate 2 is not an essential requirement. After the polarizing layer 10 is formed, the substrate can be removed. For example, the substrate 2 is prepared of polyvinyl alcohol. After the polarizing layer 10 is coated, oriented and dried/cured on the substrate 2, it is soaked into water together with the substrate 2. Subsequently, by dissolving the polyvinyl alcohol constituting the substrate 2 into water or hot water, the polarizing plate which has only the polarizing layer 10 can be obtained. By removing the substrate 2, the transmittance of the light can effectively increase. However, in this process, the particle dispersing medium or the like in a coating material for coating the polarizing layer 10 needs not to be dissolved in water.

A second embodiment of a polarizing plate according to the invention is now described. The second embodiment of the polarizing plate is different from the first embodiment in that as the bar-like polarizing particles 30 contained in the polarizing layer, two or more types of bar-like polarizing particles which are different in average aspect ratio are mixed. Namely, the polarizing plate of the second embodiment is provided with a polarizing layer for controlling a light and providing a polarized light. The polarizing layer has a particle dispersing medium with a property of light transmission and bar-like polarizing particles which are dispersed in the particle dispersing medium and arranged in a constant direction with a magnetic field. The bar-like polarizing particles are constituted by mixing two or more types of bar-like polarizing particles which are different in average aspect ratio. Each of the two or more different types of bar-like polarizing particles has a bar-like ferromagnetic particle constituted of chromium dioxide whose surface is coated with a conductive film.

As the bar-like polarizing particles contained in the polarizing layer 10, two or more types of bar-like polarizing particles which are different in average aspect ratio are mixed and used, so that the polarizing plate with a uniformly high extinction ratio and transmittance in a broad wavelength region is obtained. A preferable example of selecting two or more types of bar-like polarizing particles different in average aspect ratio in accordance with the wavelength region of the light is described in the following.

First, as the preliminary data, calculated is the average aspect ratio of the bar-like polarizing particles 30 at which an optimum extinction ratio (high extinction ratio) can be obtained for various wavelengths. Additionally, since the suitable average aspect ratio which is relative to the wavelengths changes with the used material of the bar-like polarizing particles 30, the relationship between the wavelengths and the average aspect ratio at which optimum polarizing property is obtained is preferably obtained beforehand for each of the aforementioned materials. Subsequently, to design the polarizing layer 10, a wavelength band considered to be used is set to the range from $\lambda 1$ to $\lambda 2$. From the aforementioned preliminary data, a first bar-like polarizing particle which has an average aspect ratio R1 and which has a high extinction ratio at the shorter wavelength ($\lambda 1$) in the wavelength region to be used, is selected. Subsequently, from the preliminary data, a second bar-like polarizing particle which has an average aspect ratio R2 and which has a high extinction ratio at the longer wavelength ($\lambda 2$) in the wavelength region to be used, is selected. These first and second bar-like polarizing particles are dispersed uniformly in the polarizing layer 10 as described later and arranged in the constant direction with the magnetic field. Thus, in the present invention, the polarizing property can be easily optimized in accordance with the target wavelength region from $\lambda 1$ to $\lambda 2$.

The first and second bar-like polarizing particles usually have normal distributions of aspect ratios, and have the average aspect ratio R1 and the average aspect ratio R2, respectively. Therefore, when the aspect ratio distribution of the bar-like polarizing particles in the polarizing layer 10 is checked, the layer according to the invention which is constituted by mixing two or more types of bar-like polarizing particles which are different in average aspect ratio, is different in aspect ratio distribution from the layer which contains only one type of bar-like polarizing particles. Both layers can be easily distinguished.

When the wavelength region from $\lambda 1$ to $\lambda 2$ considered to be used is relatively narrow, only two different types of the particles in average aspect ratio (two types with the average aspect ratios of R1 and R2) can be used as aforementioned. However, when the wavelength region is broad, it is practically preferable to add bar-like polarizing particles with an average aspect ratio of Rx. Here, Rx is at least one ratio selected in a range of R1<Rx<R2. For example, R1=8, R2=16, then three types of Rx=10, 12, 14 can be selected and added. Thereby, a high extinction ratio can be obtained uniformly in a broad wavelength region.

Thus, two or more types of bar-like polarizing particles which are different in average aspect ratio can be appropriately mixed, because the bar-like polarizing particle of the invention is constituted of the bar-like ferromagnetic particle of chromium dioxide whose surface is coated with the conductive film. The mixture cannot be realized by the prior arts.

The aspect ratio of the bar-like polarizing particle 30 (the bar-like ferromagnetic particle 31) used in the second embodiment is not especially restricted, but usually preferable in a range from 1.5 to 30. As aforementioned, when the ferromagnetic particles 31 having a uniform aspect ratio (one average aspect ratio) are used, the wavelength in which a high extinction ratio is obtained is restricted in a remarkably narrow range. However, in the invention, to obtain a high extinction ratio in the wavelength of a certain broad range, the bar-like polarizing particles 30 (bar-like ferromagnetic particles 31) with plural aspect ratios are used. The major axis length of the bar-like ferromagnetic particle 31 is usually about from 0.01 to 1 $\mu$m.

In the second embodiment, the material of the bar-like ferromagnetic particle 31, the material and method for forming the conductive film 35, the material of the particle dispersing medium 20, the material of the substrate 2, the method of forming the polarizing layer 10 and the like may be the same as in the first embodiment (first aspect of the invention).

Figure 5:
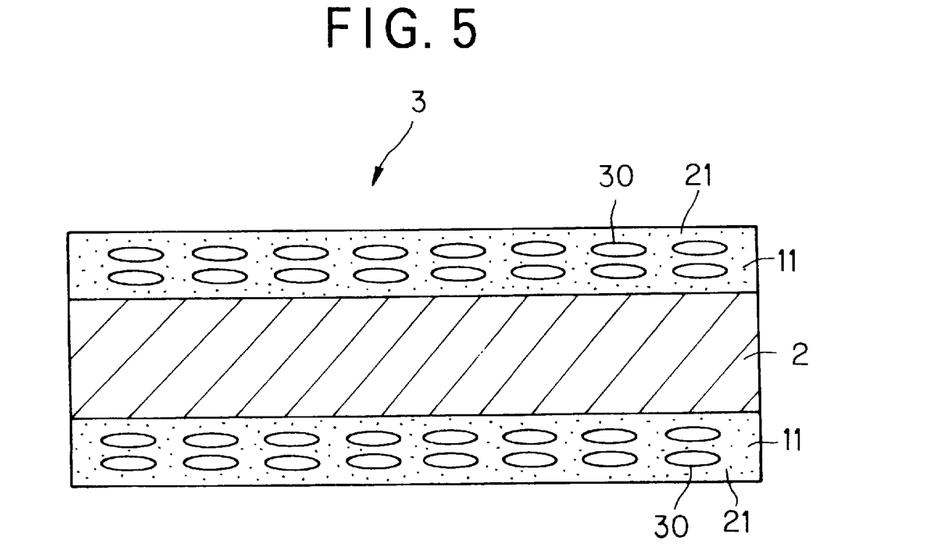
FIG. 5 is a sectional view showing a polarizing plate embodying the invention.

A third embodiment of a polarizing plate according to the invention is now described by reference to the drawing. FIG. 5 is a sectional view of the polarizing plate 3 according to the third embodiment.

As shown in FIG. 5, in the polarizing plate 3 of the invention, polarizing layers 11 are formed on both faces of the substrate 2, respectively. The polarizing layer 11 may be formed on only one side of the substrate.

The polarizing layer 11 has a glass matrix 21 and plural bar-like polarizing particles 30 which are dispersed in the glass matrix 21 and aligned in a constant direction with a magnetic field.

The bar-like polarizing particle 30, as shown in FIG. 2, has the bar-like ferromagnetic particle 31 constituted of chromium dioxide whose surface is coated with the conductive film 35.

The substrate 2 may be of any materials that have high durability and heat-resisting property, and that are transparent. For example, quartz glass, Pyrex glass or other glass substrates are preferably used. Also, the configuration is not especially restricted, and can be appropriately selected and used in accordance with the purpose, use and the like.

The glass matrix 21 in which the bar-like polarizing particles 30 are dispersed includes $SiO_2$ as a main component, and usually includes as auxiliary components at least one or more selected from $ZrO_2$, $TiO_2$, $Al_2O_3$, $GeO_2$, $Na_2O$, $K_2O$, $Li_2O$, MgO, ZnO, CaO, PbO, $B_2O_3$, $P_2O_5$, SrO and $La_2O_3$. The content rate of respective components is not especially restricted, but the main component, $SiO_2$, is included at a rate of preferably from 85 to 100 mol %, more preferably from 90 to 100 mol %.

In order to form the polarizing layer 11 with the glass matrix 21, after a sol is coated on the substrate, a coated film is formed into gel. Thereafter, an inorganic oxide is heated and formed as a certain configuration or a coat on the substrate. A so-called sol-gel process is used. The sol-gel process has advantages that the bar-like polarizing particles can be uniformly dispersed, and that the glasses which have various compositions are obtained. Further, the bar-like polarizing particles 30 can be oriented with a magnetic field and it is easy to align the particles in sol-gel process. The sol-gel process is detailed later in description of manufacturing method.

As the bar-like ferromagnetic particle 31 (FIG. 2), chromium dioxide ($CrO_2$) is used. The use of chromium dioxide has the aforementioned advantages.

The aspect ratio of the bar-like ferromagnetic particle 31 used in the invention is not especially restricted, and usually selected appropriately within a range from 1.5 to 30 in order to obtain an optimum polarizing property in accordance with a wavelength of the used light. Therefore, a high extinction ratio can be obtained for various wavelengths. Additionally, the length of major axis in the bar-like ferromagnetic particle 31 is usually about from 0.01 to 1 $\mu$m.

The surface of the ferromagnetic particle 31 constituted of chromium dioxide is coated with the conductive film 35 to form the bar-like polarizing particle 30 as aforementioned. As the conductive film 35, gold, silver, copper, nickel, tin or other metal materials with a good conductivity are used. In the present invention, by forming the conductive film 35, free electrons are permitted to exist on the surface of the bar-like polarizing particle 30. A light which has a certain direction of an electric field is absorbed because electrons in the bar-like polarizing particle 30 vibrates in the same direction of the electric field, and a polarized light is obtained. The conductive film 35 is formed by, for example, electroless plating, vacuum evaporation, vacuum sputtering or other methods.

Also, in the arranging process of the bar-like polarizing particles 30 in the constant direction with a magnetic field, for example, after the sol is coated on the substrate, a permanent magnet, an electromagnet, a solenoid or other generating means of magnetic field may be used while the coated film is in a wet gel state. The orientation is usually performed along the conveying direction of the substrate, but specified otherwise in some case and not especially restricted.

A method of manufacturing the polarizing plate according to the third embodiment is now described in detail.

A main portion of the method for manufacturing the polarizing plate according to the invention is explained as follows; the polarizing layer 11 whose main component is the glass matrix 21 including the bar-like polarizing particles 30 is formed using the sol-gel process. In detail, a sol solution which has a composition in accordance with the glass matrix 21 and which contains the bar-like polarizing particles 30 is prepared, then, it is formed as a film on the substrate with a property of light transmission and formed into a wet gel. In a magnetic field, the bar-like polarizing particles 30 are magnetically aligned. The wet gel is further formed into a dry gel, and finally vitrified. The manufacturing method is detailed by each process.

(1) First, prepared is the sol solution which has the composition in accordance with the glass matrix 21 which is the main part of the polarizing layer 11. A proper composition of the sol solution of the glass matrix 21 may be selected in accordance with the condition under which the polarizing plate is used, and with required properties and the like. Specifically, as starting materials used are alkoxide and/or its derivatives, e.g., tetraethoxysilane, methyltriethoxysilane, 3-aminopropyltriethoxysilane, trifluoropropyltrimethoxysilane and the like which correspond to the aforementioned $SiO_2$, $ZrO_2$, $TiO_2$, $Al_2O_3$, $GeO_2$, $Na_2O$, $K_2O$, $Li_2O$, MgO, ZnO, CaO, PbO, $B_2O_3$, $P_2O_5$, SrO and $La_2O_3$. By appropriately blending these components in accordance with the target composition of glass matrix, the sol solution can be prepared. Further, to form the sol solution into the wet gel state and to form the wet gel into the dry gel, the usual sol-gel process is performed. Namely, to hydrolyze the sol solution and expedite formation of the wet gel, water is mixed in the aforementioned alkoxide, its derivative or the like. Also, when Si alkoxide and its derivative are used together with other metal alkoxides or its derivatives, Si alkoxide and its derivative with a slow hydrolysis rate are hydrolyzed first. Then, other metal alkoxides and/or its derivatives may be added and mixed to further hydrolyze.

The quantity of water used in hydrolysis depends on the type of alkoxide or its derivative as the main material, but is preferably twice or more of the mole quantity of alkoxide or its derivative. Further, by using a large quantity of water, the hydrolysis time can be adjusted.

Additionally, as a catalyst used at the time of hydrolysis, hydrochloric acid, nitric acid, acetic acid or other acids, or $NH_4OH$, pyridine, piperazine or other bases may be used, which can reduce the reaction time. The quantity of the catalyst may be in the range about from $1 \times 10^{-3}$ to one time to the mole quantity of the used alkoxide or its derivative.

Also, to adjust the concentration of the metal alkoxide or the like, alcohol corresponding to the alkoxide may be applied. Further, dimethylformaldehyde or another stabilizer may be added.

(2) Subsequently, the bar-like polarization particles are added to the aforementioned sol solution to form a sol solution for coating. The used bar-like polarizing particles are as aforementioned, and the content of the bar-like polarizing particles may be appropriately selected in a range in which polarizing effect appears. Usually, the particles are applied to set the content of about 1% by volume or less, stirred and dispersed in the sol solution. At this time the operation temperature is usually from 20 to 80° C. Also, the bar-like polarizing particles are applied, a dispersing agent may be applied. After applying the bar-like polarizing particles 30 to the sol solution, the aforementioned water or catalyst can be applied.

(3) The sol solution is coated onto the substrate to form a coated film of polarizing layer. As the coating method, dipping, spin coating or other various well-known methods can be used. The coated film is formed on both faces of the substrate 2 in the embodiment of FIG. 5, but may be formed on only one face of the substrate 2 in accordance with the using condition.

(4) Subsequently, the bar-like polarizing particles in the coated film of polarizing layer are magnetically aligned in the magnetic field (orientation process with magnetic field). Generating means of the magnetic field and the orientation method are as aforementioned. The orientation process is preferably performed when the coated film is in a wet gel condition, because the aligned bar-like polarizing particles can keep the aligned state. The wet gel condition is not strictly defined, but indicates in the present invention that the bar-like polarizing particles can be moved and aligned with the magnetic field and have a certain viscosity to keep the bar-like polarizing particles in the oriented condition to some degree even after the magnetic field is removed.

(5) Subsequently, a curing process of the coated film is performed for the glass matrix in the coated film of the polarizing layer. The curing process usually includes a drying process and a burning process. In detail, after the orientation by the magnetic field, the coated film is dried at a temperature of, e.g., about from 80 to 120° C. to form a dry gel. Thereafter, the burning process is performed at a temperature of, e.g., about from 250 to 350° C. to vitrify the coated film. The temperatures of the aforementioned drying and burning processes may be appropriately selected in accordance with the composition of the glass matrix. Alternatively, only the burning process is performed, and the drying process may be omitted.

The case described above is one example that the curing process is carried out without the magnetic field after the magnetic arrangement is completed. The process is not restricted to this example. The curing process of the coated film may be performed in the magnetic field, that is, the magnetic orientation operation has continued since the previous process. Thereby, the aligned bar-like polarizing particles can be securely kept under the oriented condition. Concrete examples of the invention are now described sequentially to explain the invention in detail.

EXAMPLE I-1
Preparation of Bar-like Polarizing Particle 30

The bar-like ferromagnetic particle 31 constituted of needle-like chromium dioxide ($CrO_2$) was prepared. The length of major axis of chromium dioxide was in the range from 0.2 to 0.3 µm, the aspect ratio (length of major axis/length of minor axis) was about 10 on the average, and they have an excellent uniformity. The surface of the needle-like chromium dioxide was coated with the conductive film 35 of silver by electroless plating to form the bar-like polarizing particle 30. After the coating process with silver, the bar-like polarizing particle 30 became slightly larger than those before the coating process. However, no major change was found in the ratio of major axis to minor axis.
Preparation of Polarizing Plate Sample First, polyvinyl alcohol was dissolved in pure water to prepare 500 ml of solution with a concentration of 10%. Subsequently, by dispersing 0.25 g of the bar-like polarizing particles 30 in the solution, a paint for forming a polarizing layer was prepared.

Figure 4:
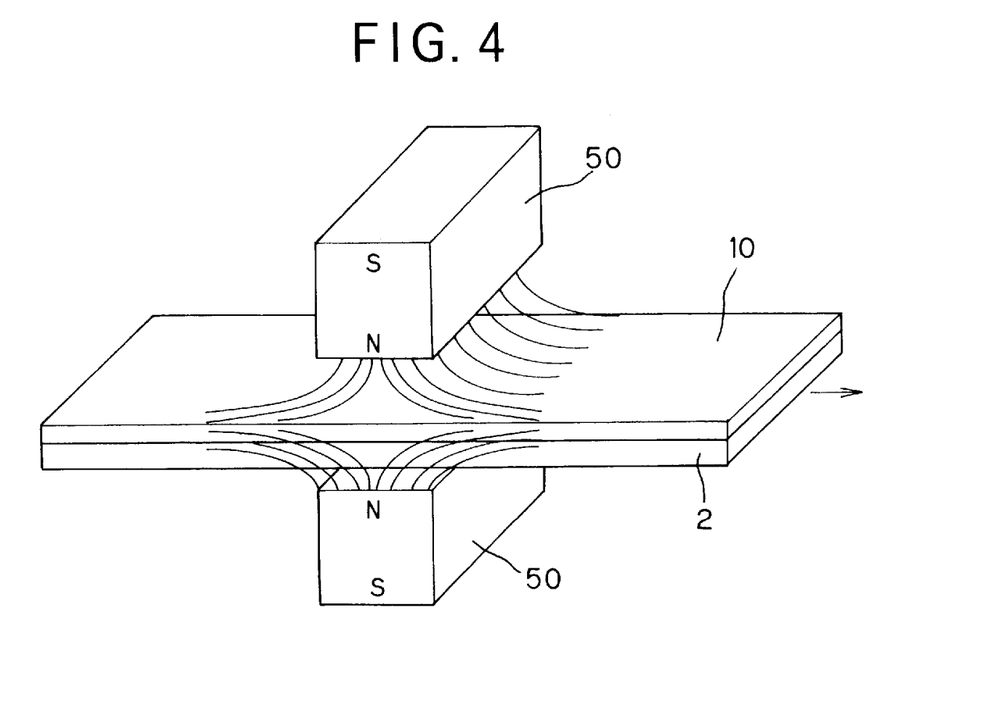
FIG. 4 is a perspective view schematically illustrating an orientation with a magnetic field.

A particle dispersing medium was coated with the paint on the transparent glass substrate 2 by a doctor blade process. After the particle dispersing medium was coated on the substrate 2 and before the particle dispersing medium was completely cured to form a polyvinyl alcohol film, as shown in FIG. 4, a magnetic field was applied in a constant direction with a pair of orientation magnets 50 disposed so as to sandwich the substrate 2 therebetween, and the bar-like polarizing particles 30 were arranged with the magnetic field in the applied direction. Thereafter, the particle dispersing medium was completely cured (polyvinyl alcohol film was formed), and a polarizing plate sample was prepared as Example I-1. Additionally, the polyvinyl alcohol film as the particle dispersing medium was cured under the heating condition of 120° C., ten minutes. After dried, the polarizing layer had a film thickness of about 3 µm.
Evaluation of Polarizing Plate Sample The extinction ratio of the prepared polarizing plate sample was measured by using a light source with a wavelength of 800 nm. As a result, a high extinction ratio value of 14 dB was obtained with Example I-1.

Compared with Example I-1, by using the same process as in Example I-1 of the polarizing plate sample except that the bar-like polarizing particle was not coated with silver, a comparative sample was prepared. The extinction ratio was measured in the same manner. As a result, polarization effect was not observed with the comparative Sample.

Consequently, it could be confirmed that by coating the surface of the ferromagnetic particle with the conductive film, the extinction ratio was remarkably enhanced and the polarizing plate having a remarkably excellent polarizing property could be obtained.

EXAMPLE I-2

The needle-like chromium dioxide ($CrO_2$) with the aspect ratio of 10 used in Example I-1 was replaced with a needle-like chromium dioxide ($CrO_2$) with the aspect ratio of 4. Other respects were the same as those of Example I-1, and a polarizing plate sample of Example I-2 was prepared.

The extinction ratio of the polarizing plate sample of Example I-2 was measured by using light sources with wavelengths of 800 nm and 550 nm. As a result, the extinction ratio 5 dB (for the wavelength of 800 nm) and the extinction ratio 8 dB (for the wavelength of 550 nm) were obtained, respectively. In this regard, the extinction ratio of the polarizing plate sample of Example I-1 was 6 dB when the light source with a wavelength of 550 nm was used.

These results show that the polarizing plate sample (aspect ratio 4) of Example I-2 has a better extinction ratio at the wavelength of 550 nm than that at the wavelength of 800 nm. Also, it can be seen that considering the extinction ratio at the wavelength of 550 nm, Example I-2 (aspect ratio 4) shows a better extinction ratio than that of Example I-1 (aspect ratio 10).

Since the bar-like polarizing particle 30 in the invention uses the ferromagnetic particle 31 constituted of chromium dioxide as a core portion, it shows an excellent uniformity of the bar-like particle configuration. Further, the aspect ratio can be selected in a broad range. Therefore, the aspect ratio can be selected in order to obtain an optimum extinction ratio in accordance with the wavelength of the light source. Further, since the surface of the ferromagnetic particle is coated with the conductive film, the extinction ratio of the ferromagnetic particle which cannot provide a high extinction ratio originally without the conductive film can be improved up to a practically high level.

The effect of the invention is clarified from the aforementioned results. In the invention, the polarizing plate is provided with the polarizing layer for controlling a light and producing a polarized light. The polarizing layer has the particle dispersing medium with a property of light transmission and the bar-like polarizing particles, which are dispersed in the particle dispersing medium and arranged in the constant direction by the magnetic field. The bar-like polarizing particle is constituted of the bar-like ferromagnetic particle of chromium dioxide whose surface is coated with the conductive film. Therefore, the polarizing plate can be manufactured inexpensively in large quantities, and has a high extinction ratio and remarkably high performance and reliability. Also, the polarizing property can be easily optimized in accordance with a wavelength of the used light.

Concrete examples of further aspect according to the invention are now described to detail the invention.

EXAMPLE II-1
Preparation of Bar-like Polarizing Particle 30

As the bar-like ferromagnetic particle 31, a needle-like chromium dioxide ($CrO_2$) was used. The chromium dioxide was prepared by mixing three types of chromium dioxide particles with average aspect ratios (length of major axis/ length of minor axis) of 11, 13 and 15. The mixing ratio by weight was about 1:1:1. The chromium dioxide had the length of major axis in the range from 0.2 to 0.3 µm and had an excellent uniformity of the configuration. The surface of the needle-like chromium dioxide was coated with the conductive film 35 of silver by electroless plating to form the bar-like polarizing particle 30. After the coating process of silver, the bar-like polarizing particle 30 became slightly larger than those before the coating process. However, no major change was found in the ratio of major axis to minor axis.

Preparation of Polarizing Plate Sample

First, polyvinyl alcohol was dissolved in pure water to prepare 500 ml of solution with a concentration of 10%. Subsequently, by dispersing 0.05 g of the bar-like polarizing particles 30 in the solution, a paint for forming a polarizing layer was prepared.

A particle dispersing medium was coated with the paint on the transparent glass substrate 2 by the doctor blade process. After the particle dispersing medium was coated on the substrate 2 and before the particle dispersing medium was completely cured to form the polyvinyl alcohol film, as shown in FIG. 4, a magnetic field was applied in the constant direction with a pair of orientation magnets 50 disposed so as to sandwich the substrate 2 therebetween, and the bar-like polarizing particles 30 were arranged with the magnetic field in the applied direction. Thereafter, the particle dispersing medium was completely cured (polyvinyl alcohol film was formed), and a polarizing plate sample was prepared. Additionally, the polyvinyl alcohol film as the particle dispersing medium was cured under the heating condition of 120° C., ten minutes. After dried, the polarizing layer had a film thickness of about 70 μm.

Evaluation of Polarizing Plate Sample

The extinction ratio of the prepared polarizing plate sample was measured by using a light source with a variable wavelength in the range from 800 nm to 1000 nm. As a result, a high extinction ratio value of 20 dB or more was obtained in the whole range of the wavelength.

Compared with the result above, in the same manner as the polarizing plate sample in the aforementioned example except that the average aspect ratio of chromium dioxide was 11 only, a comparative sample was prepared. However, to obtain a substantially equal degree of contribution to the extinction ratio of the chromium dioxide with the average aspect ratio of 11, the film thickness of the dried polarizing layer was set to about 24 μm. The extinction ratio of the comparative sample was measured in the same condition. As a result, with the wavelength 800 nm, the extinction ratio of 22 dB was obtained. With the wavelength 1000 nm, however, the extinction ratio was 7 dB.

Also, in the same manner as the polarizing plate sample in the aforementioned example except that the average aspect ratio of chromium dioxide was 15 only, another comparative sample was prepared. However, to obtain a substantially equal degree of contribution to the extinction ratio of the chromium dioxide with the average aspect ratio of 15, the film thickness of the dried polarizing layer was set to about 24 μm. The extinction ratio of the comparative sample was measured in the same condition. As a result, with the wavelength 1000 nm, the extinction ratio 23 dB was obtained. With the wavelength 800 nm, however, the extinction ratio was 10 dB.

Consequently, it could be confirmed that by mixing two or more types of bar-like polarizing particles which are different in average aspect ratios and that by preparing the polarizing plate with the mixed bar-like polarizing particles, a high extinction ratio could be obtained uniformly for a certain range of wavelengths.

Additionally, by using the bar-like polarizing particle without the coating of silver, a comparative sample was prepared in the same way in other respects as the aforementioned polarizing plate sample of the invention. The extinction ratio was measured in the same manner. As a result, polarization effect was not observed with the comparative sample.

The effect of the invention is clarified from the aforementioned results. In the invention, the polarizing plate is provided with the polarizing layer for controlling a light and producing a polarized light. The polarizing layer has the particle dispersing medium with a property of light transmission and the bar-like polarizing particles, which are dispersed in the particle dispersing medium and arranged in the constant direction with the magnetic field. The bar-like polarizing particles are constituted by mixing two or more types of the bar-like polarizing particles which are different in average aspect ratio. Each of the two or more different types of the bar-like polarizing particles is constituted of the bar-like ferromagnetic particle of chromium dioxide whose surface is coated with the conductive film. Therefore, the polarizing plate can be manufactured inexpensively in large quantities, and has a high extinction ratio and transmittance in a broad wavelength region for practical use. Also, the polarizing property can be easily optimized in accordance with the wavelength of used light.

Concrete examples of further aspect of the invention are now described to detail the invention.

EXAMPLE III-1

Preparation of Bar-like Polarizing Particle 30

As the bar-like ferromagnetic particle 31, a needle-like chromium dioxide ($CrO_2$) was used. The chromium dioxide had the length of major axis in the range from 0.2 to 0.3 μm and the average aspect ratio (length of major axis/length of minor axis) of about 10, and an excellent uniformity of the configuration. The surface of the needle-like chromium dioxide was coated with the conductive film 35 of silver by electroless plating to form the bar-like polarizing particle 30. After coating process with silver, the bar-like polarizing particle 30 became slightly larger than those before the coating process. However, no major change was found in the ratio of major axis to minor axis.

Preparation of Polarizing Plate Sample

First, a solution of the glass matrix 20 with the bar-like polarizing particles 30 dispersed therein was prepared. Specifically, at a room temperature, 0.33 g of hydrochloric acid (HCl) as a catalyst, 3.3 g of water ($H_2O$) and 8.34 g of ethanol ($C_2H_5OH$) were stirred and applied to 32.2 g of tetraethoxysilane ($Si(OC_2H_5)_4$).

Subsequently, 0.01 g of the bar-like polarizing particles 30 were applied to the solution. By stirring at 80° C., hydrolysis and polymerizing reaction were advanced.

Further, when the viscosity of the solution reached about ten poise, as shown in FIG. 4, the solution was coated on the quartz glass substrate 2. Subsequently, a magnetic field was applied in the constant direction with a pair of orientation magnets 50 disposed so as to sandwich the substrate 2 therebetween, and the bar-like polarizing particles 30 were arranged with the magnetic field in the applied direction. Thereafter, the applied film was dried at 100° C. Subsequently, the substrate 2 was heated at 300° C. in an electric furnace to perform the burning process. A polarizing plate sample of the invention was prepared with these processes. After dried, the polarizing layer had a film thickness of about 11 μm.

Evaluation of Polarizing Plate Sample

The extinction ratio of the prepared polarizing plate sample was measured by using a light source with a wavelength of 800 nm. As a result, an extinction ratio value of 30 dB was obtained.

Further, a durability test was conducted on the polarizing plate sample at high temperature and humidity. Specifically, the sample was allowed to stand for 1000 hours in the environment of 85° C.–85%RH. After the test, the extinction ratio was measured again. As a result, the extinction ratio of the sample was scarcely changed.

Consequently, it could be confirmed that the sample of the invention in which the bar-like polarizing particles 30 of the ferromagnetic particles with the surfaces coated with the conductive films were oriented in the glass matrix showed a high extinction ratio and had a remarkably good polarizing property. Further, it could be confirmed that the sample had remarkably high durability under the high temperature and humidity.

The effect of the invention is clarified from the aforementioned results. In the invention, the polarizing plate is provided with the polarizing layer for controlling a light and producing a polarized light on the substrate with a property of light transmission. The polarizing layer has the glass matrix prepared with the sol-gel process in which after a film including a sol glass matrix is coated on the substrate, the coated film is formed into gel. The polarizing layer also has the bar-like polarizing particles, which are dispersed in the glass matrix and arranged in the constant direction with the magnetic field. The bar-like polarizing particle is constituted of the bar-like ferromagnetic particle of chromium dioxide whose surface is coated with the conductive film. Therefore, the polarizing plate has remarkably high polarizing performance and reliability. Also, the polarizing plate has an excellent productivity, and can be manufactured inexpensively in large quantities. Large-sized products can be easily obtained.

Also, according to the constitution of the invention, since the aspect ratio of the bar-like polarizing particle can be easily adjusted, the polarizing property can be easily optimized in accordance with the wavelength of the light.

What is claimed is:

1. A polarizing plate which is provided with a polarizing layer for controlling a light and producing a polarized light,
    said polarizing layer being provided with a particle dispersing medium with a property of light transmission and bar-like polarizing particles which are dispersed in said particle dispersing medium and arranged in a constant direction with a magnetic field,
    each of said bar-like polarizing particles being provided with a bar-like ferromagnetic particle constituted of chromium dioxide whose surface is coated with a conductive film.

2. The polarizing plate according to claim 1 wherein an aspect ratio of said bar-like ferromagnetic particle is in the range from 1.5 to 30.

3. A polarizing plate which is provided with a polarizing layer for controlling a light and producing a polarized light,
    said polarizing layer being provided with a particle dispersing medium with a property of light transmission and bar-like polarizing particles which are dispersed in said particle dispersing medium and arranged in a constant direction with a magnetic field,
    said bar-like polarizing particles being constituted of mixing two or more types of bar-like polarizing particles which are different in average aspect ratio, and each of said two or more different types of bar-like polarizing particles having a bar-like ferromagnetic particle constituted of chromium dioxide whose surface is coated with a conductive film.

4. The polarizing plate according to claim 3 wherein an aspect ratio of said bar-like polarizing particle is in a range from 1.5 to 30.

5. The polarizing plate according to claim 3 wherein the bar-like polarizing particles contained in the said polarizing layer are constituted by selecting and mixing a first bar-like polarizing particle with an average aspect ratio R1 at which high extinction ratio is obtained on a shorter wavelength side of a wavelength region to be used and a second bar-like polarizing particle with an average aspect ratio R2 at which high extinction ratio on a longer wavelength side of the wavelength region to be used.

6. The polarizing plate according to claim 5 wherein the bar-like polarizing particles contained in said polarizing layer are constituted by applying and mixing bar-like polarizing particles with an average aspect ratio Rx which is at least one ratio selected from a range of R1<Rx<R2.

7. A polarizing plate which is provided with a polarizing layer for controlling a light and producing a polarized light on a substrate with a property of light transmission,
    said polarizing layer being provided with a glass matrix which is formed in a sol-gel process by applying a coating mixture including a sol glass matrix to the substrate followed by gelation of an applied film, and with bar-like polarizing particles which are dispersed in said glass matrix and arranged in a constant direction with a magnetic field,
    each of said bar-like polarizing particles being provided with a bar-like ferromagnetic particle constituted of chromium dioxide whose surface is coated with a conductive film.

8. The polarizing plate according to claim 7 wherein an aspect ratio of said bar-like ferromagnetic particle is in the range from 1.5 to 30.

9. A method of manufacturing a polarizing plate provided with a polarizing layer for controlling a light and producing a polarized light on a substrate with a property of light transmission, which comprises:
    a process of preparing a sol solution with a composition in accordance with a glass matrix which is a main part of the polarizing layer;
    a coating solution preparation process of preparing a sol solution for coating by letting said sol solution contain bar-like polarizing particles, and each of the bar-like polarizing particles having a bar-like ferromagnetic particle of chromium dioxide whose surface is coated with a conductive film;
    a coating process of said sol solution on the substrate to form a polarizing layer;
    a magnetic field orientation process of arranging the bar-like polarizing particles in said polarizing layer with a magnetic field; and
    a curing process of the glass matrix in said coated polarizing layer.

10. The method of manufacturing the polarizing plate according to claim 9 wherein said magnetic field orientation process is performed while the glass matrix is in a wet gel condition.

11. The method of manufacturing the polarizing plate according to claim 9 wherein said curing process includes a drying process and a burning process.

12. The method of manufacturing the polarizing plate according to claim 9 wherein said curing process is performed with the magnetic field orientation process being applied.

* * * * *